Dec. 29, 1959 G. SCHOHAN 2,919,395

FULL-WAVE MAGNETIC AMPLIFIER ARRANGEMENTS

Filed July 12, 1957 3 Sheets-Sheet 1

INVENTOR.
GEORGE SCHOHAN

BY [signature]
[signature]
ATTYS.

Dec. 29, 1959 G. SCHOHAN 2,919,395

FULL-WAVE MAGNETIC AMPLIFIER ARRANGEMENTS

Filed July 12, 1957 3 Sheets-Sheet 2

INVENTOR.
GEORGE SCHOHAN

BY W. O. Quesenberry

ATTYS.

Dec. 29, 1959 G. SCHOHAN 2,919,395

FULL-WAVE MAGNETIC AMPLIFIER ARRANGEMENTS

Filed July 12, 1957 3 Sheets-Sheet 3

INVENTOR.
GEORGE SCHOHAN

BY [signature]
[signature]

ATTYS.

United States Patent Office 2,919,395

Patented Dec. 29, 1959

2,919,395

FULL-WAVE MAGNETIC AMPLIFIER ARRANGEMENTS

George Schohan, Washington, D.C.

Application July 12, 1957, Serial No. 671,674

4 Claims. (Cl. 323—89)

(Granted under Title 35, U.S. Code (1952), sec. 266)

The invention described herein may be manufactured and used by or for the Government of the United States of America for governmental purposes without the payment of any royalties thereon or therefor.

The present invention relates generally to full-wave magnetic amplifiers and more particularly to full-wave magnetic amplifiers characterized by novel control circuit configurations which enhance the gain thereof. The invention is also directed to the provision of unique load circuit interconnections in full-wave magnetic amplifiers to develop transient currents therein that provide positive magnetic feedback and negative electric feedback.

Most conventional full-wave magnetic amplifiers are formed with a pair of saturable reactor half-wave sections conductively energized in phase opposition and with control windings on each section serially connected across a control signal source. The series control windings arrangement of these prior art circuits results in dissipation of control signal current in the respective control windings of the reactor sections during their respective conductive half-cycles. Additional deleterious effects arise from transformer action caused by control winding coupling.

The general purpose of the present invention is to circumvent the disadvantages exhibited by prior art control circuits in full-wave magnetic amplifiers. This is achieved, in accordance with the invention, by including a respective pair of polarity-opposing rectifiers in series circuit relationship with the control windings of each half-wave reactor section of a full-wave magnetic amplifier operatively energized from an A.C. power supply source, the pair of rectifiers of one section being simultaneously conductive on alternate half-cycles of one polarity of the A.C. source and the pair of rectifiers of the other section being simultaneously conductive on the other alternate half-cycles of the supply source. Since only one pair of rectifiers is conductive during any given period, only the conducting rectifiers become negligible impedance devices to present a conductive path to the control signal, the non-conducting pair of rectifiers blocking control signal conduction by virtue of the fact that at least one of the non-conductive rectifiers is poled to present its high back impedance to the control signal. Therefore, control current can flow in the control windings of either half-wave reactor section, depending on which control windings are activated by the reset current, but not at the same time. Thus, the control windings of the reactor sections are isolated from each other, thereby preventing both the loss of control current in the inactive control windings and the occurrence of transformer action resulting from control winding coupling.

The present invention also contemplates the provision, in bridge type half-wave reactor sections connected to form a full-wave amplifier, of novel output circuit interconnections which provide positive magnetic feedback and negative electric feedback. This is attained by connecting a common load across the output terminals of the two bridge sections in such a manner that the output voltage delivered by one section to the load is of such polarity as to produce a transient current which flows in two paths through the other section to provide therefor positive magnetic feedback and negative electric feedback. The positive magnetic feedback is obtained in the aforesaid other section by the transient flowing through the load windings of the dominating reactor core in such a direction as to aid the control action, and thus increases the gain of the section; whereas, the negative-electric-feedback transient current flows in the control circuit of the aforesaid other section in a direction opposing the control current flow and results in a "self-balancing" action, which is generally desirable in magnetic amplifier designs. The concept of "self-balancing" action in magnetic amplifiers was introduced in the art by W. A. Geyger, U.S. Patent 2,700,130, the manner of attaining "self-balancing" therein being different, in circuitry and principle of operation, from that of the instant invention.

With the foregoing in mind, it is an object of the present invention to provide a new and improved control circuit arrangement for full-wave magnetic amplifiers.

Another object is to provide novel output circuit interconnections between the half-wave reactor sections of a full-wave magnetic amplifier to develop therein transient currents which supply positive magnetic feedback and negative electric feedback.

A further object of the invention is the provision of a control circuit arrangement for a dual-section full-wave magnetic amplifier in which the control circuit of one section is isolated from the control section of the other section, although being supplied with a control signal from a common control source.

Other objects and many of the attendant advantages of this invention will be readily appreciated as the same becomes better understood by reference to the following detailed description when considered in connection with the accompanying drawings in which like reference characters designate like parts throughout the figures thereof and wherein.

Figure 1:
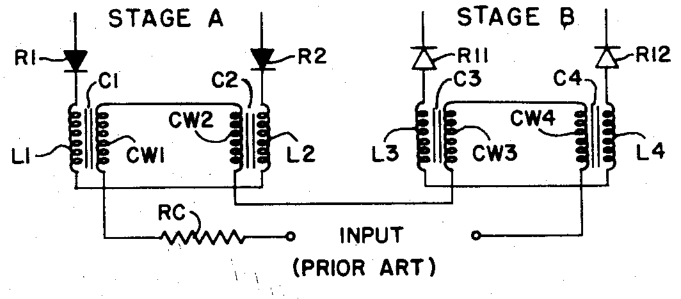
Fig. 1 is a partial schematic circuit of a bridge-type full-wave magnetic amplifier with the prior art control circuit arrangement.

Referring to the prior art arrangement of Fig. 1, stages A and B are rendered alternately conductive on successive half-cycles of an A.C. power supply source, as is conventional; and control is applied to the stages during their respective non-conductive half-cycles. Therefore, the power, or conductive, half-cycle of stage A is the control half-cycle of stage B, and vice-versa. Consequently, under the conditions when stage B is conducting [delivering output] and stage A is being controlled, it is seen that a portion of the control signal voltage is dropped across the control windings CW3—CW4 of stage B, resulting in loss of control voltage on the control windings CW1—CW2 of stage A which should be receiving substantially all of the control signal voltage in order to provide optimum output gain. From this, it is apparent that it would be advantageous to isolate the control windings of stage A from the control windings of stage B so as to impress the full control signal voltage across the control windings of stage A. A further advantage derived from isolating the control windings is the prevention of transformer action caused by control winding coupling between stages.

Figure 2:
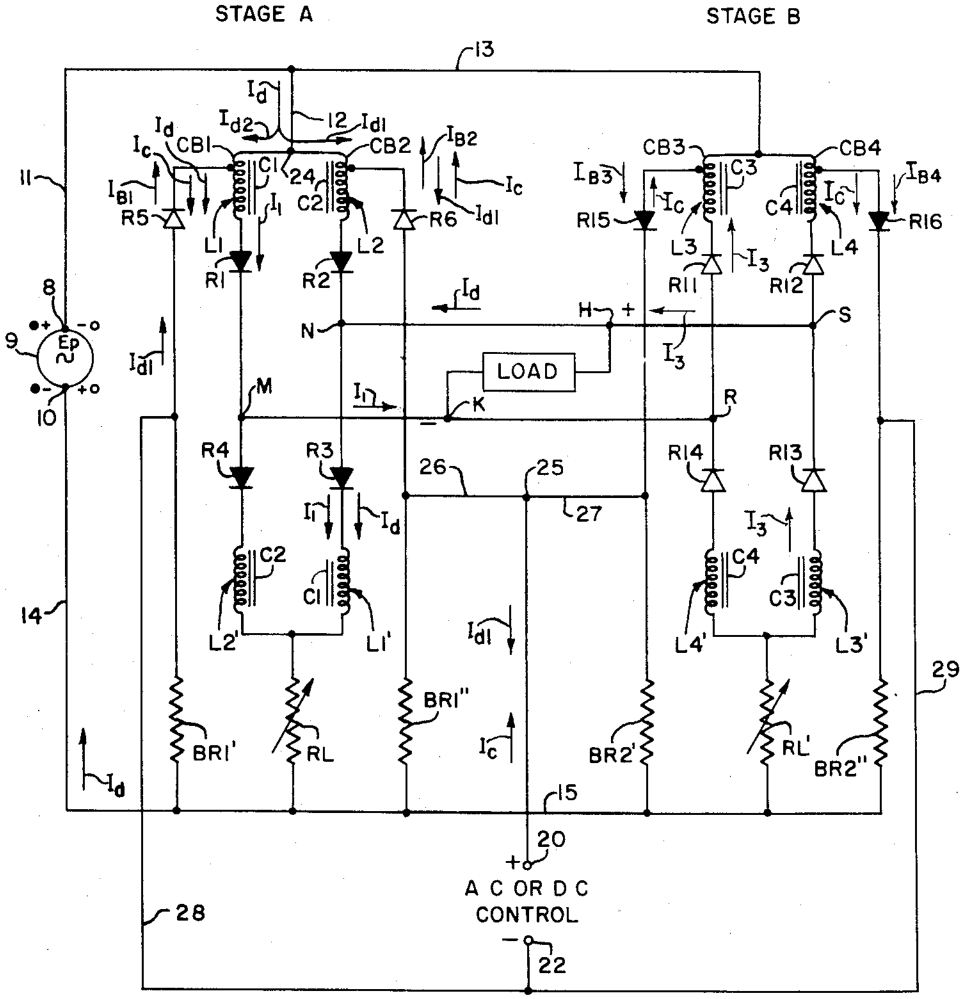
Fig. 2 is a schematic circuit full-wave bridge magnetic amplifier incorporating the novel control circuit and output feedback developing means in accordance with the general concept of the present invention.

With reference to Fig. 2, which illustrates a preferred form of the invention embodying the principle of control winding isolation and the utilization of feedback transient-producing means, an A.C. power supply source 9 is connected to alternately energize, on successive half-cycles thereof, a pair of half-wave bridge stages A and B, connected to form a full-wave magnetic amplifier, through line resistors $R_L$ and $R_L'$, respectively. Half-wave magnetic bridge stage A consists of core reactors C1 and C2 with load windings L1, L1' and L2, L2', wound respectively thereon and rectifiers R1, R2, R3 and R4 which are similarly poled to pass load current through the load windings on the alternate half-cycles of source 9 when terminal 8 is positive. Stage B likewise consists of a pair of cores C3 and C4 with load windings L3, L3' and L4, L4' respectively thereon and rectifiers R11, R12, R13 and R14 which are similarly poled to pass load current through the load windings thereof on the alternate half-cycles of source 9 when terminal 10 is positive. Therefore, the bridge stages A and B are operatively conductive in phase opposition to alternately supply load current on successive half-cycles of source 9, it being noted that the black polarity symbols across the terminals of source 9 are indicative of conduction of the black rectifiers and that the white polarity symbols thereacross represent the conductive half-cycles of the white rectifiers.

The saturable reactor cores C1, C2, C3 and C4 are preferably of a magnetic material having rectangular hysteresis loop characteristics such, for example, as Orthonol. All the rectifiers in stages A and B are preferably of the silicon diode or germanium type, although they may be dry-disk rectifiers. The opposite terminals H and K of a load are connected respectively to output terminals N and M of stage A and respectively to output terminals S and R of stage B.

Each of stages A and B utilizes a portion of the load windings to serve as common bias and control windings, the bias-control windings of stage A being defined by windings CB1 and CB2 and those of stage B being formed by CB3 and CB4. The reset, or bias, circuit of stage A comprises the two parallel circuit branches BR1'—R5—CB1 and BR1''—R6—CB2; whereas the reset circuit of stage B consists of the two parallel branches BR2'—R15—CB3 and BR2''—R16—CB4. The reset circuit of stage A is conductive during the non-conductive half-cycles of the stage A bridge; while the reset circuit of stage B conducts during the non-conductive half-cycles of the stage B bridge. Or conversely, the reset circuit of stage A conducts during the half-cycles which stage B delivers load output; and the reset circuit of stage B conducts during the power half-cycles of stage A.

A control source, either phase-reversible D.C. or A.C., is connected across terminals 20 and 22 to supply control signal to windings CB1—CB2 of stage A only when rectifiers R5 and R6 are conductive and to windings CB3—CB4 of stage B only when rectifiers R15 and R16 conduct, as will become more apparent hereinafter. The control circuit of stage A may be traced from terminal 20 to terminal 25 and through lead 26, rectifier R6, windings CB2 and CB1, rectifier R5 and through conductor 28 to terminal 22. It is apparent that rectifiers R5 and R6 are in series circuit relation with windings CB1 and CB2 and are in polarity opposition in the series circuit relation. The control circuit of stage B may likewise be traced from terminal 25 through the rectifiers R15 and R16 and windings CB1 and CB2, the rectifiers having the same phasing relation as in stage A.

In operation with a D.C. control signal and for the moment disregarding the feedback transient currents, the following actions occur. During the black polarity half-cycle of source 9 which half-cycle is the power half-cycle of stage A and the reset half-cycle of stage B, load current $I_1$ flows through the load windings of stage A in a manner depending on the unbalance thereof caused by the control signal $I_c$ applied thereto during the preceding half-cycle, and bias currents $I_{B3}$ and $I_{B4}$ flow through windings CB3 and CB4, respectively, in the direction indicated by the arrowed lines. Attention is directed to the fact that all the illustrated arrowed lines of the current components indicate only current flow direction and are not representative of relative magnitudes, the latter being dependent on numerous and variable factors as is well known to those skilled in the art.

Due to bias current flowing through rectifiers R15 and R16 during this half-cycle, these rectifiers are rendered conductive and become negligible impedance devices. Therefore, upon application of a control signal, control current flows in the control circuit of stage B from terminals 20, 25 via conductor 27, rectifier R15, windings CB3 and CB4, rectifier R16 and lead 29 back to the other side of the control source at terminal 22, it being noted that the direction of control current $I_c$ being opposed to reset current $I_{B3}$ in winding CB3 and aiding reset current $I_{B4}$ in winding CB4. However, with regard to the control circuit of stage A, it is seen that rectifier R5 presents its back impedance to the control current and hence prevents conduction of control current in the control circuit of stage A during this half-cycle, the possible control circuit path of stage A being traceable from terminal 25 through rectifier R6 and windings CB2—CB1 with rectifier R5. Thus, from the foregoing, it is apparent that, during the black polarity half-cycles, the control circuits of stages A and B are isolated from each other; and, control current flows only through the control circuit of stage B, thereby avoiding loss of unuseable control signal voltage in the control circuit of stage A.

During the white polarity half-cycle which is the power half-cycle of stage B and the reset half-cycle of stage A, the aforedescribed events are reversed with stage B now delivering load current $I_3$ and the control current $I_c$ flowing only through the control circuit of stage A by virtue of the conductive condition of rectifiers R5 and R6 due to bias currents $I_{B1}$ and $I_{B2}$. Rectifier R15 presents back impedance to the control current and prevents conduction of control current in the control circuit of stage B. Therefore, as occurs during the black polarity half-cycles, the control circuit of only one stage [stage A] presents a conductive path to the control current during the white polarity half-cycles.

Now considering the development of the feedback transients and assuming the white polarity condition of source 9 [power half-cycle of B and reset half-cycle of A] with a D.C. control signal of polarity shown, core C3 of stage B fires first since the control signal during the preceding half-cycle opposed the reset action of core C3. This results in a load current $I_3$ flowing in a direction illustrated by the arrowed lines to produce a voltage drop across the load of polarity shown [positive at H and negative at K]. This voltage is reflected to stage A with the result that a D.C. transient current $I_d$ flows to terminal N and through rectifier R3, load winding L1', line resistor $R_L$, conductor 14 through source 9, and conductors 11 and 12. At terminal 24, current $I_d$ splits into currents $I_{d1}$ and $I_{d2}$, with current $I_{d1}$ flowing through the control circuit of stage A via winding CB2 and rectifier R6, lead 26 to terminal 20 through the control source, lead 28, rectifier R5 and to the tap on winding CB1 where it additively rejoins current $I_{d2}$ to form current $I_d$.

It is to be noted that, since rectifiers R5 and R6 are conductive during this period, these rectifiers permit current $I_{d1}$ to flow through the control circuit in the same manner as aforedescribed with respect to the control current. It is also to be noted that current component $I_{d1}$ opposes the normal flow of control current $I_c$ and therefore provides a negative feedback current which results in a substantially "self-balancing" action.

Returning now to current component $I_d$, upon being reformed at the tap of winding CB1, the current $I_d$ flows through load winding L1, rectifier R1, and to terminal M back to the other side of the load at terminal K. It is to be noted that the direction of current $I_d$ through the load windings L1 and L1' is such as to aid the control action of core C1 and thus provides positive magnetic feedback. During the black polarity half-cycles, the development of transients may be analyzed in a similar manner with the exception that the voltage across the load is positive at terminal K and that the transients flow through stage B.

In order to adapt the circuit of Fig. 2 for operation from an A.C. control source, terminals H and K are reversed so as to be connected to output terminals M and N, respectively, instead of N and M, respectively, as shown. As is conventional, the carrier of the control signal is of the same frequency as the power source 9 and in-phase therewith so that terminal 20 is positive when terminal 8 is positive. In this manner, the aforedescribed coactions occur.

Figure 3:
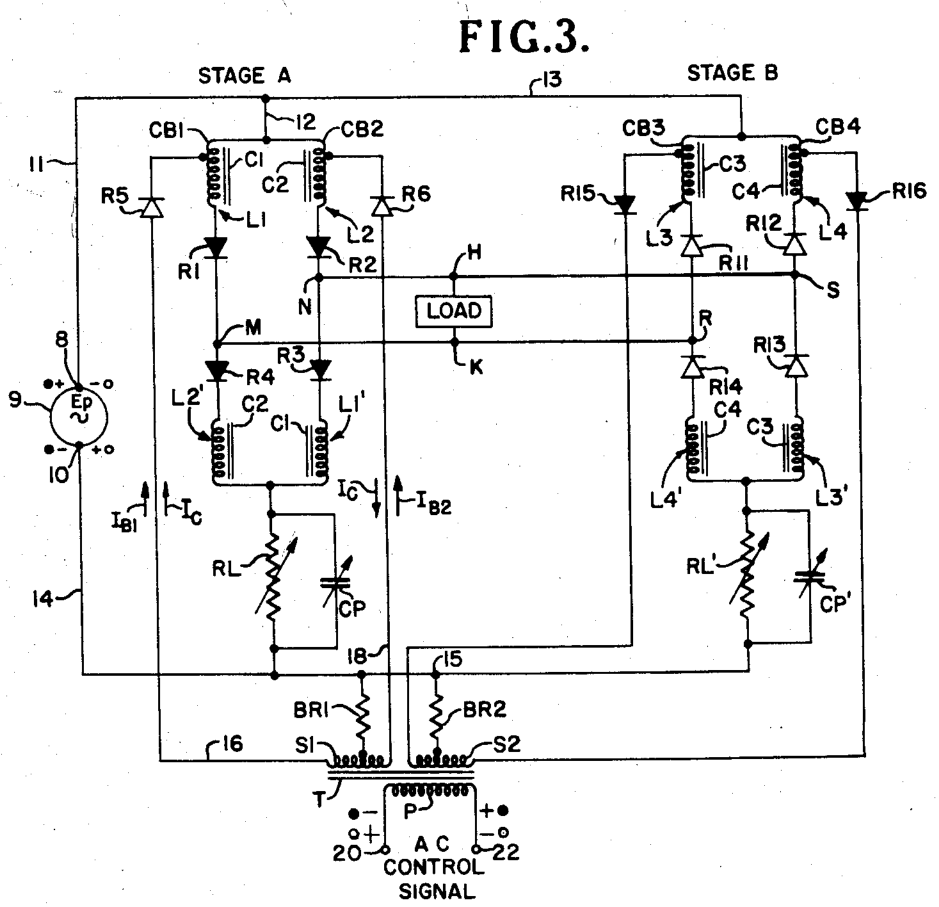
Fig. 3 is a modification of Fig. 2 and is adapted for operation from only an A.C. control signal.

Fig. 3 is similar in circuit construction and operation to Fig. 2, like parts having corresponding reference numerals, except that a transformer T is employed to apply an A.C. control signal to the amplifier. The primary P is connected to terminals 20 and 22 to receive the A.C. control signal. The secondary winding S1 has a center-tap connected to terminal 10 of source 9 through bias resistor BR1 and conductor 14. The opposite ends of secondary S1 are connected to rectifiers R5 and R6 to complete the bias and control circuits. Bias is applied to stage A during the white polarity half-cycles of source 9 through bias resistor BR1 and through the two branches as indicated by current components $I_{B1}$ and $I_{B2}$. Control current flow, for the polarity shown across terminals 20 and 22, is through lead 16, rectifier R5, windings CB1 and CB2, rectifier R6 and conductor 18. The secondary winding S2 is similarly connected in the control and bias circuits of stage B. It is understood that the carrier of the control source will be in-phase with power source 9. Otherwise, the operation of the circuit of Fig. 3 is the same as described with respect to Fig. 2.

Figure 4:
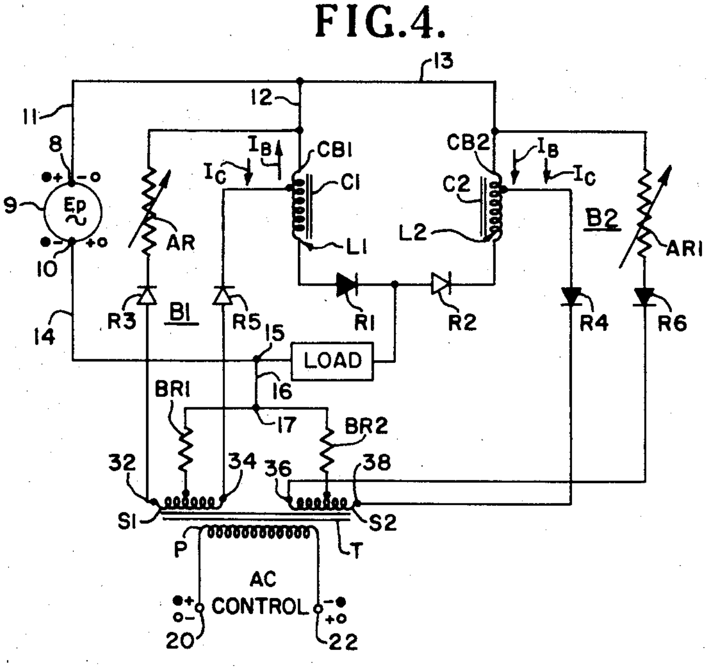
Fig. 4 is a schematic diagram of a single-ended type of full-wave magnetic amplifier utilizing the novel control circuit of the present invention for producing a phase-reversible D.C. output.

Referring now to Fig. 4, wherein is shown a full-wave magnetic amplifier composed of a pair of single-ended half-wave sections connected to be alternately energized on successive half-cycles of a power source 9 through a common load, one single-ended section consists of a saturable reactor C1 with load winding L1 thereon in series with a rectifier R1. The other section includes core C2 with load winding L2 in series with rectifier R2. As in the preceding figures, the graphical symbols represent conduction of black rectifiers during black polarities of source 9 and conduction of white rectifiers during white polarities of source 9. The carrier of the control signal being in phase with source 9 with the black and white polarities thereof being in time coincidence with the black and white polarities of source 9.

A.C. control is applied through a transformer T having a primary winding P connected across the input terminals 20 and 22 and a pair of secondary windings S1 and S2. A portion, indicated as CB1 and CB2, of the load windings L1 and L2 serve to function as common control and bias windings. Bias is applied, during white polarity half-cycles, to bias circuit B1 of core C1 from terminal 10 of source 9 via bias resistor BR1 in conjunction with secondary S1 and in one branch through rectifier R5 and winding CB1 and in a second branch through rectifier R3 and balancing resistor AR. During the black polarity half-cycles of source 9, bias is applied in a similar manner to bias circuit B2 through resistor BR2 and secondary S2.

The bias and control circuit arrangement of Fig. 4 operates in substantially the same manner as described for Fig. 2 in isolating the control circuits of the two single-ended section. That is, when bias circuit B1 is conductive, bias circuit B2 is non-conductive; and, control current flows through rectifiers R3, R5 and winding CB1 of bias circuit B1 but does not flow through bias circuit B2. On the other half-cycle when bias circuit B2 conducts, control current flows therein but not in bias circuit B1. It is to be noted that, for the polarities of control and power sources shown, the control current $I_c$ opposes the bias current in core C1 and aids the bias current in core C2. This action is effective to product a full-wave phase-reversible D.C. output.

Figure 5:
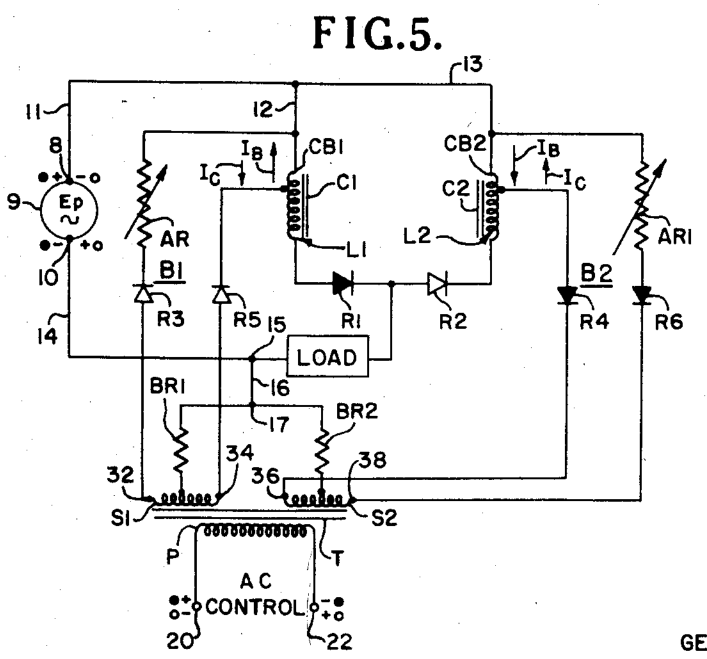
Fig. 5 is a modification of Fig. 4 for producing an A.C. output.

In order to obtain an A.C. output, the connections of rectifiers R4 and R6 are reversed so as to be connected to terminals 36 and 38, respectively, as shown in Fig. 5, which is exactly the same as Fig. 4 except for this reversal of connection. This reversed connection results in a control current flow which opposes the bias current flow in both of cores C1 and C2, as shown by the arrowed lines. Such bias current and control current relationship produces an A.C. output, as is readily understood by those skilled in the art. It is to be noted that the full-wave circuits of Figs. 4 and 5 are operated from an A.C. control source, which manner of operation is unconventional in the art for this type of circuit, prior art control of single-ended full-wave magnetic amplifiers being D.C. The advantage obtained with A.C. control in the manner described in Figs. 4 and 5 is a half-cycle speed of response; whereas similar prior art circuits controlled with a D.C. control signal are characterized by the poor speed of response of from 15 to 40 cycles of the power supply source frequency.

Obviously many modifications and variations of the present invention are possible in the light of the above teachings. It is therefore to be understood that, within the scope of the teachings herein and the appended claims, the invention may be practiced otherwise than as specifically described.

What is claimed as new and desired to be secured by Letters Patent of the United States is:

1. A full-wave magnetic amplifier comprising, in combination, a source of alternating current; a load; a first branch circuit including a first load winding on a saturable reactor, first rectifier and said load connected in series, said first branch circuit being connected across said source; a second branch circuit serially including a second load winding on a saturable reactor, a second rectifier and said load, said second branch circuit being connected across said source; said first and second rectifiers being oppositely poled whereby said first and second branch circuit alternately conduct on successive half-cycles of said source; a first bias circuit operatively associated with said first branch circuit and connected to said source, unidirectional conductive means in said bias circuit phased to pass half-cycle pulses through a portion of said first load winding during the non-conductive half-cycles of said first branch to thereby establish reference flux level therein; a second bias circuit operatively associated with said second branch circuit and connected to said source, unidirectional conductive means in said second bias circuit phased to pass half-cycle pulses from said source through a portion of said second load windings during the non-conductive half-cycles of said second branch circuit to thereby establish reference flux level therein; and translating means connected in series circuit relation with the unidirectional conductive means of said first bias circuit and in series circuit relation with the unidirectional conductive means of said second bias circuit, said translating means comprising a transformer having a primary winding connectable to a source of control signal current and a pair of center tapped secondary windings, said unidirectional conductive means of said first and second bias circuits each comprising a pair of rectifiers, the opposite ends of one of said secondary windings being connected to a respective one of the rectifiers in said first bias circuit with the rectifiers being similarly poled with respect to the center-tap thereof, and the opposite ends of the other of said secondary windings being connected to a respective one of the rectifiers of said second bias circuit with the rectifiers similarly poled with respect to the center tap thereof, and circuit connections for connecting the center taps of said first and second secondary windings to a common terminal of said source, the unidirectional conductive means of said first and second bias circuits being effective during their respective conductive periods to pass current from said translating means through their respective load winding portions and being effective during their respective non-conductive periods to suppress conduction of current from said translating means.

2. In a full-wave magnetic amplifier formed by a pair of half-wave saturable reactor sections alternately energized on successive half-cycles from an alternating current source and each including load windings on saturable reactors; a combined control and bias circuit comprising the combination of first reset circuit means operatively associated with one of said sections and including a pair of rectifiers connected to be simultaneously conductive during the non-conductive half-cycles of said one section to apply reset current to a portion of the load windings thereof, a second reset circuit means operatively associated with the other of said sections and including a pair of rectifiers connected to be simultaneously conductive during the non-conductive half-cycles of said other section to apply reset current to a portion of the load windings thereof, and a control current translating circuit connectable to a control source and connected to form a first series branch circuit includnig the load winding portion of said one section and the rectifiers of said first reset circuit means and to form a second series branch circuit including the load winding portion of said other section and the rectifiers of said second reset circuit means, the rectifiers of said first and second reset circuit means being connected in polarity opposition in their respective series branch circuits.

3. A full-wave magnetic amplifier arrangement comprising, in combination, a pair of power supply terminals connectable to a source of alternating current; a first half-wave magnetic amplifier stage and a second half-wave magnetic amplifier stage; each of said half-wave magnetic amplifier stages including four impedance elements connected in a closed circuit to form a bridge circuit, at least two of said impedance elements comprising load windings wound on a respective core of saturable magnetic material, circuit means connecting said load windings to form separate parallel branch circuits in said bridge circuit, connections for connecting said parallel branch circuits across said pair of power supply terminals, unidirectional conductive means connected in each of said branch circuits and arranged so that current flows simultaneously through the load windings only during alternate half-cycles of said alternating current source, control means on each of said cores and formed by a portion of each load winding, unilateral conductive means in series with each of said portions to form a pair of series circuits, and circuit means coupling said series circuits in parallel across said pair of terminals, said unilateral conductive means being arranged as to be simultaneously energized from said power supply terminals during the non-conductive half-cycles of said branch circuits; control current translating means, connected through common terminals, in tandem with the pair of series circuits of said first half-wave stage and in tandem with the pair of series circuit of said second half-wave stage; and a pair of output terminals common to said first and second stages to produce thereacross on each conductive alternation of one of said stages an output voltage of such polarity as to supply positive magnetic feedback current and negative electric feedback current to the other of said stages.

4. A full-wave magnetic amplifier comprising, in combination, a pair of power terminals connectable to an alternating current source; a load; a pair of half-wave bridge magnetic amplifiers, each of said amplifiers including first and second saturable core reactors, a first inductive load winding on said first reactor and connected to a unidirectional conductive device to form one leg of the bridge, a second inductive load winding on said first reactor and connected to a unidirectional conductive device to form the bridge leg diagonally opposite said one leg, a third inductive load winding on said second reactor and connected to a unidirectional conductive device to form a third leg of the bridge, a fourth inductive load winding on said second reactor and connected to a unidirectional conductive device to form a bridge leg diagonally opposite said third leg, circuit means connecting said power terminals across one pair of opposite terminals of said bridge and connecting said load across the other pair of opposite terminals of the bridge, all of said unidirectional conductive devices being similarly poled in said bridge circuit to pass half-wave current pulses through said bridge on the same half-cycle of said source, biasing means consisting of a pair of parallel branch circuits connected across said power terminals, one of said branch circuits serially including a rectifier and a portion of said second load winding, the other of said branch circuits serially including a rectifier and a portion of said third load winding, said rectifiers being poled to pass current from said source on the same half-cycle but during the half-cycle which said bridge is non-conductive, and an input control circuit connected to receive a control signal from a control source and including in series circuit relation said rectifiers and said portions of said second and third load windings, said rectifiers being connected in polarity opposition in said series circuit relation; the unidirectional conductive devices of one of said amplifiers being oppositely poled with respect to the unidirectional conductive devices of the other amplifier whereby said amplifiers are alternately conductive on successive half-cycles of the alternating current applied to said power terminals; and control current supply means connected, through common terminals, in series with the input control circuit of one of said amplifiers and in series with the control circuit of the other of said amplifiers.

References Cited in the file of this patent

UNITED STATES PATENTS

| | | |
|---|---|---|
| 2,754,474 | Barnhart | July 10, 1956 |
| 2,764,723 | Scorgie | Sept. 25, 1956 |
| 2,770,770 | Lufcy | Nov. 13, 1956 |
| 2,773,133 | Dunnet | Dec. 4, 1956 |

OTHER REFERENCES

Publication: "A Transient-Controlled Magnetic Amplifier," by George Schohan; Navord Report 4258, pub. March 29, 1956, U.S. Naval Ordnance Lab., White Oak, Md.; pp. 1, 2 and 11.